(12) United States Patent  (10) Patent No.: US 8,497,637 B2
Liu  (45) Date of Patent: Jul. 30, 2013

(54) CONSTANT VOLTAGE DIMMABLE LED DRIVER

(76) Inventor: Gang Gary Liu, Plano, TX (US)

( * ) Notice: Subject to any disclaimer, the term of this patent is extended or adjusted under 35 U.S.C. 154(b) by 252 days.

(21) Appl. No.: 13/066,388

(22) Filed: Apr. 13, 2011

(65) Prior Publication Data

US 2012/0262084 A1   Oct. 18, 2012

(51) Int. Cl.
  H05B 37/02   (2006.01)
  H05B 39/04   (2006.01)
  H05B 41/36   (2006.01)
  F02P 3/08    (2006.01)

(52) U.S. Cl.
  USPC ............. 315/225; 315/209 CD; 315/172

(58) Field of Classification Search
  USPC ................ 315/225, 209, 172, 186, 246
  See application file for complete search history.

(56) References Cited

U.S. PATENT DOCUMENTS

| 7,038,399 | B2 | 5/2006 | Lys et al. |
| 7,609,008 | B1 | 10/2009 | Kohler |
| 7,649,327 | B2 | 1/2010 | Peng |
| 7,852,017 | B1 | 12/2010 | Melanson |
| 2008/0278092 | A1 | 11/2008 | Lys et al. |
| 2009/0251934 | A1* | 10/2009 | Shteynberg et al. ............ 363/81 |
| 2009/0295300 | A1 | 12/2009 | King |
| 2010/0060200 | A1* | 3/2010 | Newman et al. .............. 315/307 |
| 2010/0134038 | A1 | 6/2010 | Shackle et al. |
| 2010/0259196 | A1* | 10/2010 | Sadwick et al. ............... 315/309 |
| 2010/0277103 | A1 | 11/2010 | Zou |
| 2010/0295478 | A1 | 11/2010 | Wei et al. |
| 2011/0012530 | A1 | 1/2011 | Zheng et al. |
| 2011/0037399 | A1 | 2/2011 | Hung et al. |
| 2011/0043129 | A1* | 2/2011 | Koolen ......................... 315/291 |
| 2011/0181196 | A1* | 7/2011 | Kang et al. .................... 315/246 |
| 2012/0146545 | A1* | 6/2012 | Nerone ......................... 315/297 |
| 2012/0319605 | A1* | 12/2012 | Choi et al. .................... 315/201 |

* cited by examiner

*Primary Examiner* — Shawki Ismail
*Assistant Examiner* — Dylan White

(57) ABSTRACT

A constant voltage dimmable LED (Light Emitting Diode) driver is disclosed that is compatible with all types of dimmers, including conventional phase cut (TRIAC) dimmers, and behaves like a conventional constant voltage driver which can be connected to any size of LED load that has a matching voltage rating. The driver produces a continuous train of pulses for driving the LED load and obtains an averaged measure of the voltage at the AC input for controlling the duty cycle of the continuous train of pulses. Therefore, when the averaged measure of the voltage at the AC input is reduced by a dimmer, the duty cycle reduces, resulting in a dimmed LED. The driver can be created by adding a few components to a conventional wide input range AC-DC converter without or with very little modifications.

16 Claims, 7 Drawing Sheets

CONSTANT VOLTAGE DIMMABLE LED DRIVER

FIELD OF THE INVENTION

The embodiments discussed herein relate to a power supply for driving light emitting diodes (LEDs).

BACKGROUND OF THE INVENTION

The use of LEDs in lighting applications is rapidly expanding, as they are much more efficient and have much longer life time than incandescent lamps. Compared with fluorescent lighting systems, LEDs also have an advantage that they do not contain harmful substances such as mercury.

LEDs are primarily DC devices and usually require a much lower voltage than the mains AC power provided by utility companies. For this reason, a power supply or "driver" is needed for converting the mains AC power to a DC voltage or current appropriate for driving the LEDs.

Conventional AC-DC converters can be used as LED drivers. They have been developed and perfected for many years. They provide high efficiency and can be manufactured in mass quantities with very low cost. However, they are fundamentally incompatible with conventional dimmers, such as TRIAC dimmers, that are designed primarily for incandescent lamps. The reason is conventional AC-DC converters try to, and in fact, have been perfected to, regulate the output voltage for a wide range of input voltage and load variations. Therefore, when a dimmer is used to reduce the voltage supplied to a conventional AC-DC converter, the converter still tries to maintain the same output voltage and will not dim the light, until the input voltage is so low that the converter cannot work anymore, it will abruptly shut off or become unstable.

Converters that are compatible with conventional dimmers (so called "dimmable LED drivers") can be made using various techniques. Examples include designs described in U.S. Pat. Nos. 7,649,327, 7,852,017, 7,609,008, 7,038,399 and U.S. patent applications 20110043129, 20110037399, 20110012530, 20100295478, 20100277103, 20080278092, 20100134038, 20090295300. However, all these designs require significant deviations from the design of conventional AC-DC converters and some are so complex as to require the use of microprocessors. Therefore, these designs cannot leverage the well developed and perfected designs of conventional AC-DC converters. As a result, the currently commercially available dimmable LED drivers are usually much more expensive than conventional AC-DC converters of the same wattage. Furthermore, most of the commercially available dimmable LED drivers are constant current type while a constant voltage type of LED driver is more desirable especially in flexible LED strip applications.

OBJECT OF THE INVENTION

Applicant recognizes and appreciates that a constant voltage type of LED driver is much more desirable than a constant current type especially in flexible LED strip applications. Because LED strips are usually specified by the voltage, while a constant current LED driver requires carefully matching the current of the driver with the LED strip or the LED strip may be burned out or does not give enough light. Furthermore, Applicant recognizes and appreciates that in many applications, LED strips often need to be cut into various lengths during the installation resulting in non-standard current requirements that a matching constant current LED driver simply cannot be found. In contrast, a conventional constant voltage AC-DC converter, although not "dimmable", only requires matching of the voltage rating of the LED with the converter as long as the wattage of the LED does not exceed the maximum wattage of the AC-DC converter. For example, a 12V 100 W AC-DC converter can be used to drive a 12V 100 W LED strip as well as a 12V 5 W LED strip. Therefore, a 12V LED strip can always be connected to a 12V constant voltage LED driver regardless of what length the LED strip is cut into. Even if the wattage of the LED strip exceeds the maximum wattage of the AC-DC converter, the converter is usually equipped with over current protection and will be either current limited or shut down. There is no possibility of damaging either the LED or the converter, as long as the voltage rating is matched.

There is a need for a dimmable LED driver that is compatible with conventional dimmers, can leverage the well developed and perfected art of making conventional AC-DC converters, and behaves like a conventional constant voltage AC-DC converter that only requires matching of the voltage ratings. It is an object of this invention to provide such a constant voltage dimmable LED driver.

SUMMARY OF THE INVENTION

In one aspect, the current invention provides a circuit and a method for adapting an AC input to drive a load, which include a measuring circuit for obtaining an averaged measure of the voltage at the AC input and a power converting module for converting the AC input into a continuous train of pulses for driving the load, wherein the continuous train of pulses having a duty cycle controlled by the averaged measure of the voltage at the AC input obtained by the measuring circuit. The load can be one or more LEDs. The AC input can be obtained from an AC power source optionally through a dimmer.

The averaged measure of the voltage at the AC input can be approximately proportional to a simple average of the absolute value of the voltage at the AC input.

The power converting module can include an AC-DC converter and a switch for turning on and off a current path between the AC-DC converter and the load with a duty cycle controlled by the averaged measure of the voltage at the AC input obtained by the measuring circuit.

The switch for turning on and off the current path between the AC-DC converter and the load can be controlled by a pulse width modulator that oscillates at a substantially fixed frequency above human's flickering perception threshold and has a pulse width controlled by the averaged measure of the voltage at the AC input obtained by the measuring circuit.

The pulse width modulator can include a first voltage comparator or op-amp for controlling charging and discharging of a capacitor to create, at the capacitor, a continuously running voltage waveform that ramps up and down corresponding to charging and discharging of the capacitor and a second voltage comparator or op-amp for comparing the voltage at the capacitor with a voltage representing the averaged measure obtained by the measuring circuit, wherein the output of the second voltage comparator or op-amp is used to control the switch for turning on and off the current path between the AC-DC converter and the load.

The AC-DC converter can operate stably over a wide range of the AC input to produce a substantially constant voltage output and, as the voltage at the AC input is gradually reduced, the duty cycle gradually reduces and can reach 0% slightly before the voltage at the AC input reaches the low end of the stable operating range of the AC-DC converter.

The AC-DC converter can include a rectifier, an isolation diode, and a DC-DC converter, wherein the input of the rectifier is connected to the AC input, the output of the rectifier is connected to the anode of the isolation diode, the cathode of the isolation diode is connected to the input of the DC-DC converter, and the measuring circuit obtains its input from the output of the rectifier before the isolation diode.

The circuit and the method for adapting an AC input to drive a load can further include a bleeder for providing minimum holding current for the dimmer. The bleeder does not have to be perfect and can have a small amount of premature termination of the holding current and pulse to pulse variations.

According to the current invention, a constant voltage type of dimmable LED driver can be created by adding a few components to the design of a conventional AC-DC converter without or with very little modifications. Therefore, the well developed and perfected art of making conventional AC-DC converters can be leveraged to quickly create such a dimmable LED driver.

DETAILED DESCRIPTION OF THE PREFERRED EMBODIMENTS

Figure 1:
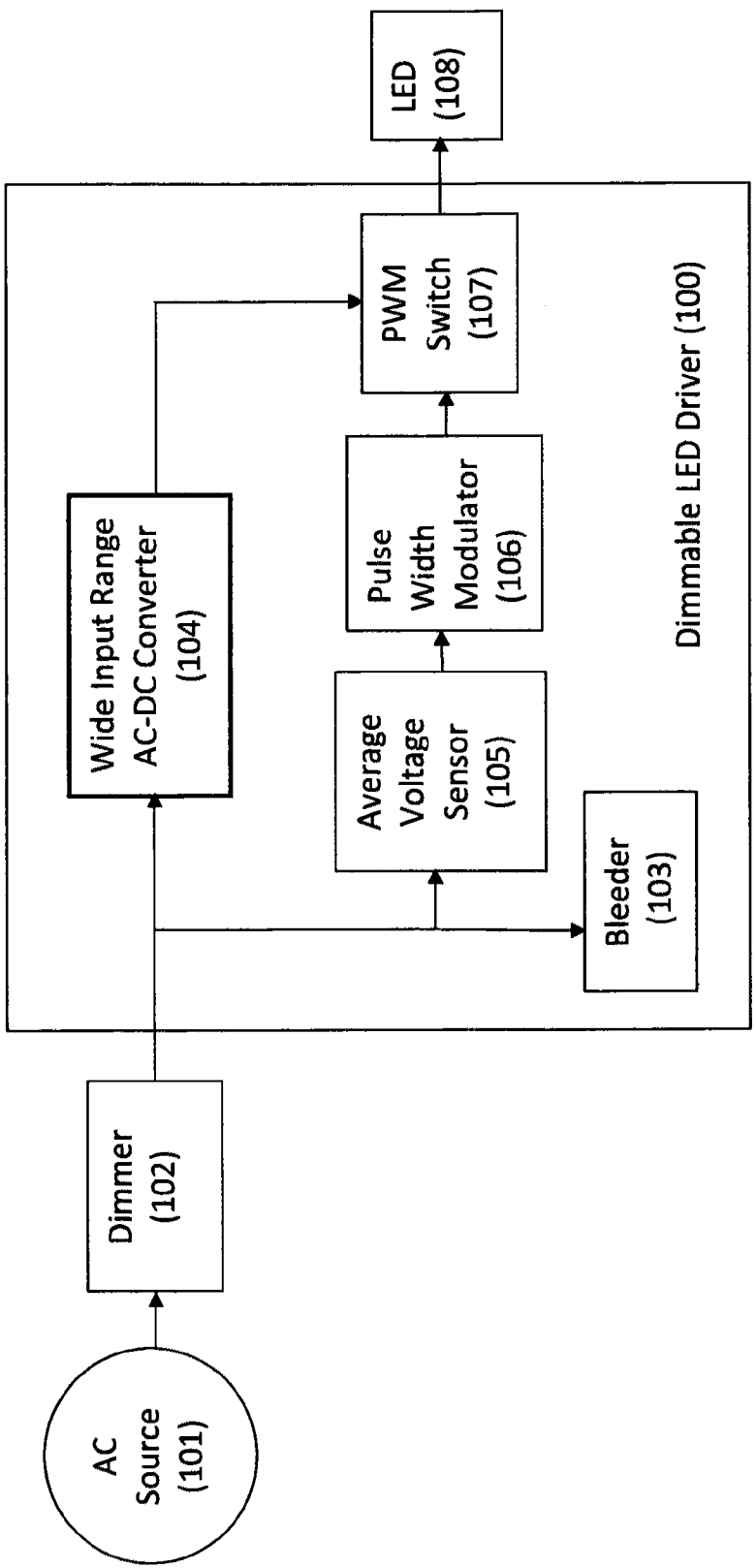
FIG. 1 shows an embodiment of the current invention, which can be made by adding a few components to a conventional AC-DC converter module without modification.

FIG. 1 shows how a dimmable LED driver can be made from a conventional AC-DC converter module by adding a few components. As shown in FIG. 1, the power from the AC power source (101) passes through Dimmer (102) and is fed into the input of the dimmable LED driver (100) made according to the current invention. The output of the dimmable LED driver (100) is connected to LED (108). Dimmer (102) can be any type of dimmer that can be used for dimming an incandescent lamp, including leading edge phase dimmers, trailing edge phase dimmers, or VARICs (variable output voltage transformers), as long as the average voltage fed into the dimmable LED drive (100) can be gradually reduced under user control. LED (108) can be one LED or any type of arrangement of LED arrays, including flexible LED strips or other type of LED lighting fixture that can be driven by a specific DC voltage (for example, 12V).

The dimmable LED driver (100) can be made from an AC-DC converter module (104) by adding additional components including Bleeder (103), Average Voltage Sensor (105), Pulse Width Modulator (106), and PWM Switch (107). The AC-DC converter module (104) needs to be able to accept wide range of input voltages and output a constant or nearly constant voltage that matches the specified voltage rating of the LED (108). For example, a so called "universal input" power supply that is specified for 85V-264V AC input range can be used as the wide input range AC-DC converter (104). Dimmable LED driver (100) can be made by using an off-the-shelf AC-DC converter module (104) separately manufactured (or purchased from a vendor) and adding the rest of the components (103), (105), (106), (107) fabricated on a separate board. It can also be fabricated as one board that includes the design of an AC-DC converter module (104) (which can be directly copied from a well developed and perfected conventional AC-DC converter without modification) and the rest of the components (103), (105), (106), (107) designed according to the current invention. Bleeder (103) is used for holding a minimum current for certain type of dimmer that require a minimum holding current. The Bleeder (103) can be any type of passive bleeder, such as a simple resistor, or any type of active bleeder, such as one that is turned on only when the AC voltage is below certain level or when the AC-DC converter (104) does not draw enough current for holding a TRIAC dimmer conductive. If the dimmer (102) does not require a minimum holding current, Bleeder (103) can be ignored. Average Voltage Sensor (105) is used to measure the average voltage at the output of the dimmer (102). The average is taken over many cycles of the AC power frequency, typically 50-60 Hz. For convenience of discussions, the term "average voltage" is used herein and throughout this specification to mean taking average of the absolute value of the voltage without regarding the positive/negative signs (otherwise, the average of a symmetrical AC signal is always 0). All types of dimmers output an average voltage corresponding to the dimming level, and therefore the average voltage measured by the Average Voltage Sensor (105) represents the dimming level. The average voltage measured by the Average Voltage Sensor (105) is used to control the Pulse Width Modulator (106). The Pulse Width Modulator (106) generates a continuous train of pulses whose duty cycle is controlled by the average voltage measured by the Average Voltage Sensor (105). The Pulse Width Modulator (106) should be running at a frequency above human's flicking perception threshold (for example 2 kHz) independent of the frequency of the AC power source (101). The output of the Pulse Width Modulator (106) is used to control the PWM Switch (107) to turn on and off the connection between the AC-DC converter (104) and the LED (108). In this way, as a user adjusts the dimmer (102) to dim the light, the average voltage at the dimmer output drops reducing the fraction of time (i.e. the duty cycle) the power supplied to the LED (108) is turned on. Because the LED (108) is turned on and off at a frequency higher than the threshold of human perception. it will appear that the LED (108) is simply dimmed without any flickering.

Care should be taken in designing the Pulse Width Modulator (106) to ensure that the duty cycle can reach 0% (constantly off) before the average AC voltage drops to a level that the AC-DC converter (104) does not work anymore. For example, if the AC-DC converter (104) stops working when the average AC voltage drops below 20V, then the Pulse Width Modulator (106) can be designed to reach 0% duty cycle (constantly off) when the average AC voltage drops to a level slightly higher than 20V. It is also reasonable to leave some margin on the high voltage side to ensure that the duty cycle can reach 100% (constantly on) slightly before the dimmer output reaches 100% of the input, because there are always some variations in the AC voltage of the power lines and some dimmers never reach 100% of the input. An example design to be used with north American's 120V/60 Hz power utility is that the duty cycle of the Pulse Width Modulator (106) will change from 100% to 0% when the average AC voltage at the output of the dimmer (102) changes from 96V to 24V. (Please note, for a sine wave: Average=($2\sqrt{}$/ $2/\pi$) RMS. Therefore 96V average voltage corresponds to 106.6V RSM, leaving about 11% margin on the high side.)

Applicant has observed that although a universal input AC-DC converter is typically specified to work for an input range of 85V to 264V, it can still work at much lower input voltage levels when used as described in the current invention. The reason is because the 85V limit is specified as the lower limit that the AC-DC converter can still provide the full power. When used in the current invention, however, if the input voltage is very low, the duty cycle that drives the LED (108) is also very low, and therefore the AC-DC converter only needs to provide very little power. Another reason is that a typical AC-DC converter has a bridge rectifier in the front, followed by a low pass filter with a large capacitor before feeding the rectified signal to a DC-DC converter. The rectifier and the large capacitor following it effectively forms a peak holder when the load current is very low. Therefore, even if the average voltage is very low, the voltage fed into the DC-DC converter is effectively the peak voltage which can be significantly higher than the average voltage, especially when the signal is dimmed by a phase cut dimmer. For these reasons, the lower limit of the average input voltage can usually be extended to a much lower level than the specified input voltage range. Applicant has observed that a typical universal input AC-DC converter specified to work over an input voltage range of 85V to 264V still works for an average input voltage as low as 20V when used in the current invention. If a conventional universal input AC-DC converter does not work at very low voltage level when used in the current invention, it is usually easy to slightly modify the design of the converter to make it work. One skilled in the art will be able to do the appropriate modification.

Figure 2:
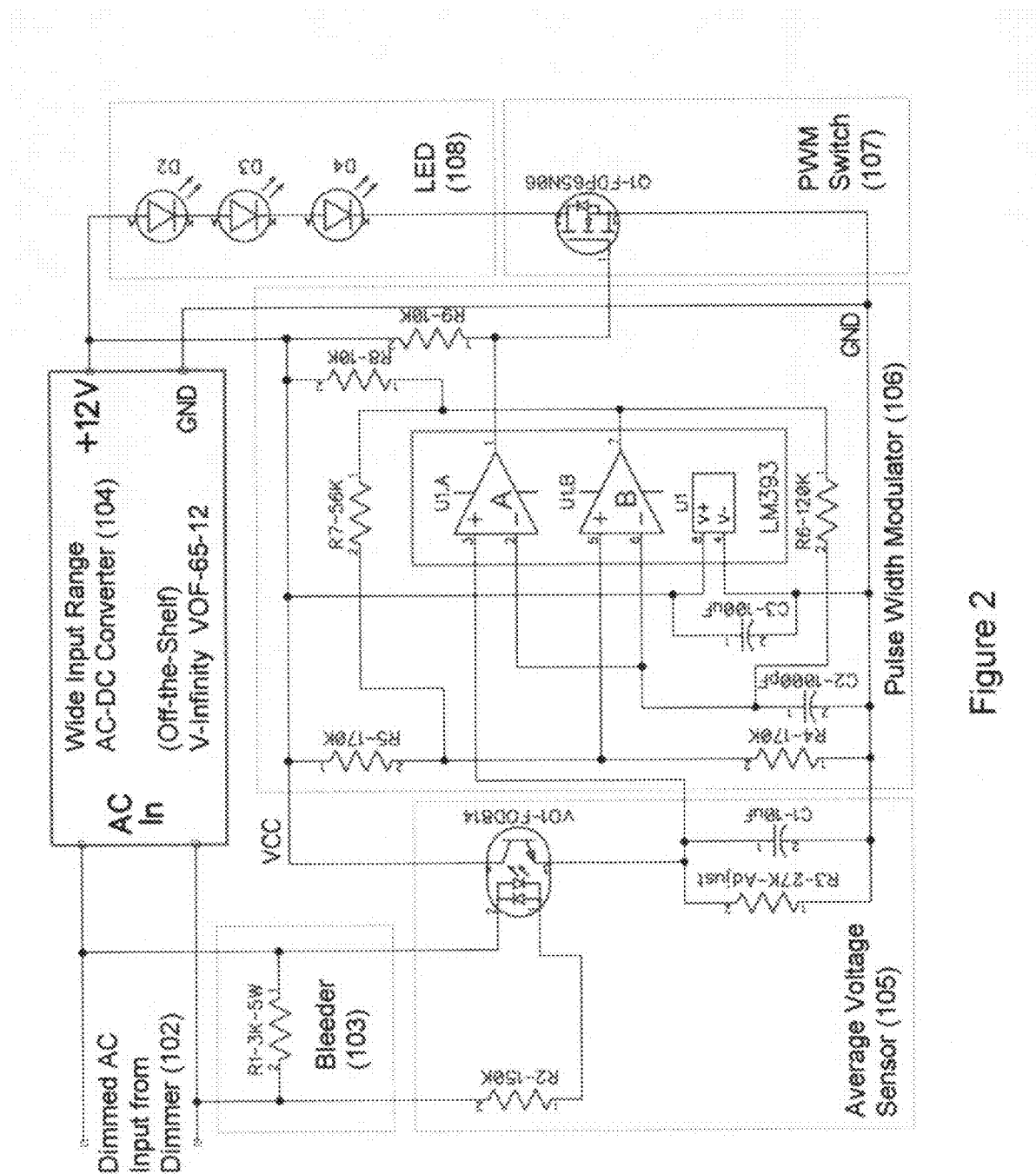
FIG. 2 shows one example implementation details of the embodiment shown in FIG. 1.

FIG. 2 shows the details of an example implementation of the embodiment shown in FIG. 1. While the example contains many specific details, these specific details should not be construed as limiting the scope of the invention. One of ordinary skills in the art will recognize that the invention can be implemented in variety of ways different from the example shown herein.

In this example, the Bleeder (103) is simply a resistor R1. One of ordinary skills in the art will recognize that the Bleeder (103) can be implemented in variety of ways as long as a minimum holding current is maintained when the AC-DC converter (104) does not draw enough current. The Average Voltage Sensor (105) directly measures the average AC voltage at the output of dimmer (102). The AC voltage at the output of the dimmer (102), through the resistor R2, causes an AC current at the input side of the optoisolator VO1 and produces a proportional DC current on the output (phototransistor) side. Note that an AC optoisolator such as FOD814 made by Fairchild Semiconductor allows AC input and therefore allows the average voltage to be directly measured from the AC source without the need of a rectifier. The current on the output side of VO1 is proportional to the voltage at the output of the dimmer and fluctuates with it. However, because there is a large capacitor C1 in parallel with resistor R3 which will be charged when the output current of VO1 is higher than average and discharged when it is lower than average, the current that flows though resistor R3 is essentially the average output current of VO1. Therefore, the voltage across R3 is essentially proportional to the average AC voltage at the output of the dimmer (102), but will be limited by the VCC (12V). The voltage across resistor R3, which is the output of the Average Voltage Sensor (105), can be approximately calculated as $(rR3/R2)<V_{ac}>$ when the result is less than VCC, but will be limited to VCC if the result is greater than VCC (the saturation voltage of the phototransistor in VO1, typically 0.2-0.5V, is ignored), where $<V_{ac}>$ is the average AC voltage at the output of the dimmer (102) and r is the current transfer ratio of the optoisolator VO1. In the example implementation of FIG. 2, VO1 has a current transfer ratio of 55%. Therefore, the voltage across R3 is calculated to be about 10% of the average AC voltage at the output of the dimmer (102). When the average AC voltage at the output of the dimmer (102) changes from 96V to 24V, the output of the Average Voltage Sensor (105) changes from 9.6V to 2.4V. Because the current transfer ratio of optoisolators has large variations, R3 may need to be adjusted to match the optoisolator VO1. In large volume productions, it may be necessary to pre-sort optoisolators into different bins of roughly the same current transfer ratio to be used in the same batch of production. In this way, R3 can be fixed for the batch. This problem can be avoided if optoisolator is not used in the Average Voltage Sensor, as shown in the example of FIG. 5. which will be discussed later.

Figure 7:
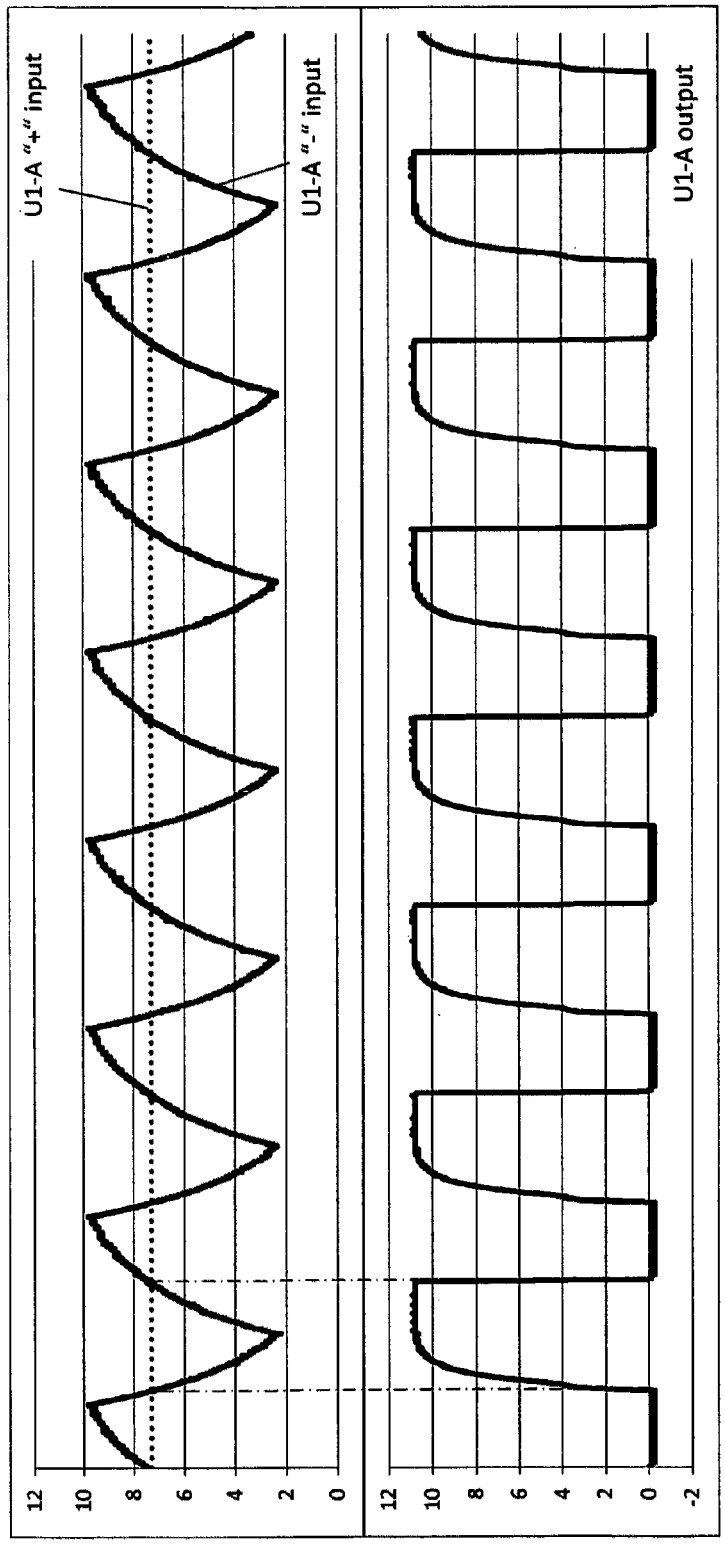
FIG. 7 shows some waveforms to demonstrate how the Pulse Width Modulator (106) and (307) can be implemented using two voltage comparators.

As shown in FIG. 2, the Pulse Width Modulator (106) can be made using two voltage comparators. (Op-amps can also be used instead of comparators, although op-amps are optimized for linear operations while linearity is not necessary here.) One comparator U1-B is used to form an oscillator. It works as the following: When the output of U1-B is high, the voltage at the "+" input of comparator U1-B will be pulled up by resistors R7 and R5 against R4 to about 80% of the VCC while capacitor C2 will be charged through resistor R6. As the capacitor C2 is charged to a voltage exceeding the voltage at the "+" input of U1-B (80% of VCC). the output of U1-B will reverse and become low. When the output of U1-B is low, the "+" input of U1-B will be pulled down by resistor R7 and R4 against R5 to about 20% of VCC and capacitor C2 will be discharged through resistor R6. When capacitor C2 is discharged to a voltage below the "+" input of U1-B (20% of VCC), the output of U1-B will reverse and become high again, and the cycle continues. In this way, the voltage across capacitor C2 will oscillate between 20% of VCC and 80% of VCC creating a waveform shown in the upper part of FIG. 7. Such a waveform is fed into the "−" input of comparator U1-A while the "+" input of U1-A is connected to the output of the Average Voltage Sensor (105). The output voltage of the Average Voltage Sensor (105) is represented by the dotted horizontal line in the upper part of FIG. 7. When the "+" input of U1-A is higher than the "−" input, the output of U1-A will be high, and vice versa, creating a waveform shown in the lower part of FIG. 7, in which the pulse width is equal to the time the voltage across capacitor C2 is below the output of the Average Voltage Sensor (105). In this way, as the output of the Average Voltage Sensor (105) changes from 20% of VCC (about 2.4V) to 80% of VCC (about 9.6V), the duty cycle of the output of the Pulse Width Modulator (106) changes from 0% to 100%. The output of the Pulse Width Modulator (106) is used to drive the PWM Switch (107), which can be an N-Channel MOSFET Q1, to turn on and off the current path between the AC-DC converter module (104) and the LED (108). Q1 should be chosen to support large current and have very low resistance when turned on. For example, FDP65N06 made by Fairchild Semiconductor has an on resistance of less than $0.016\Omega$, and therefore at 5 A current, the voltage drop across Q1 is less than 0.08V and the power dissipation is less than 0.4W. No heat sink is needed. The AC-DC converter module (104) used in this example is an off-the-shelf 65 W 12V power supply VOF-65-12 made by V-Infinity. The 12V output of the power supply is also used to power the VCC of the Pulse Width Modulator (106) and part of the Average Voltage Sensor (105).

Figure 3:
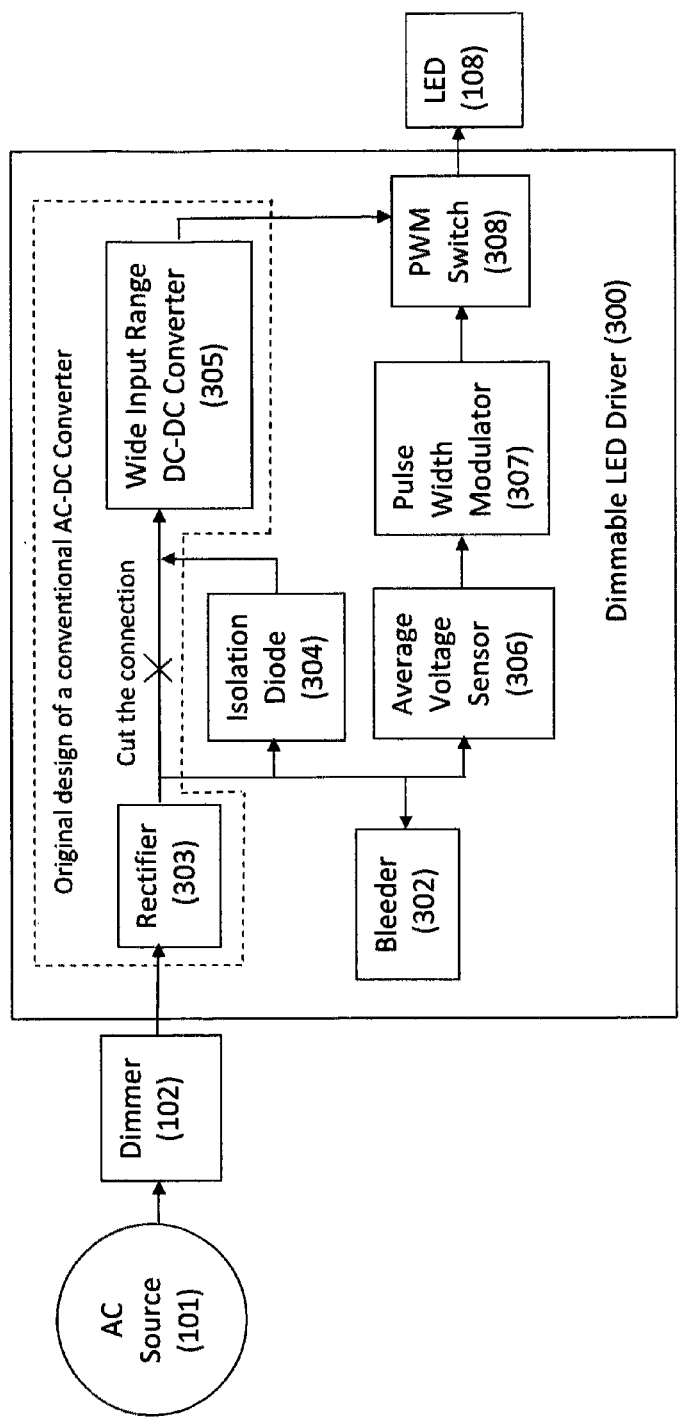
FIG. 3 shows another embodiment of the current invention, which can be made by slightly modifying the design of a conventional AC-DC converter.
Figure 4:
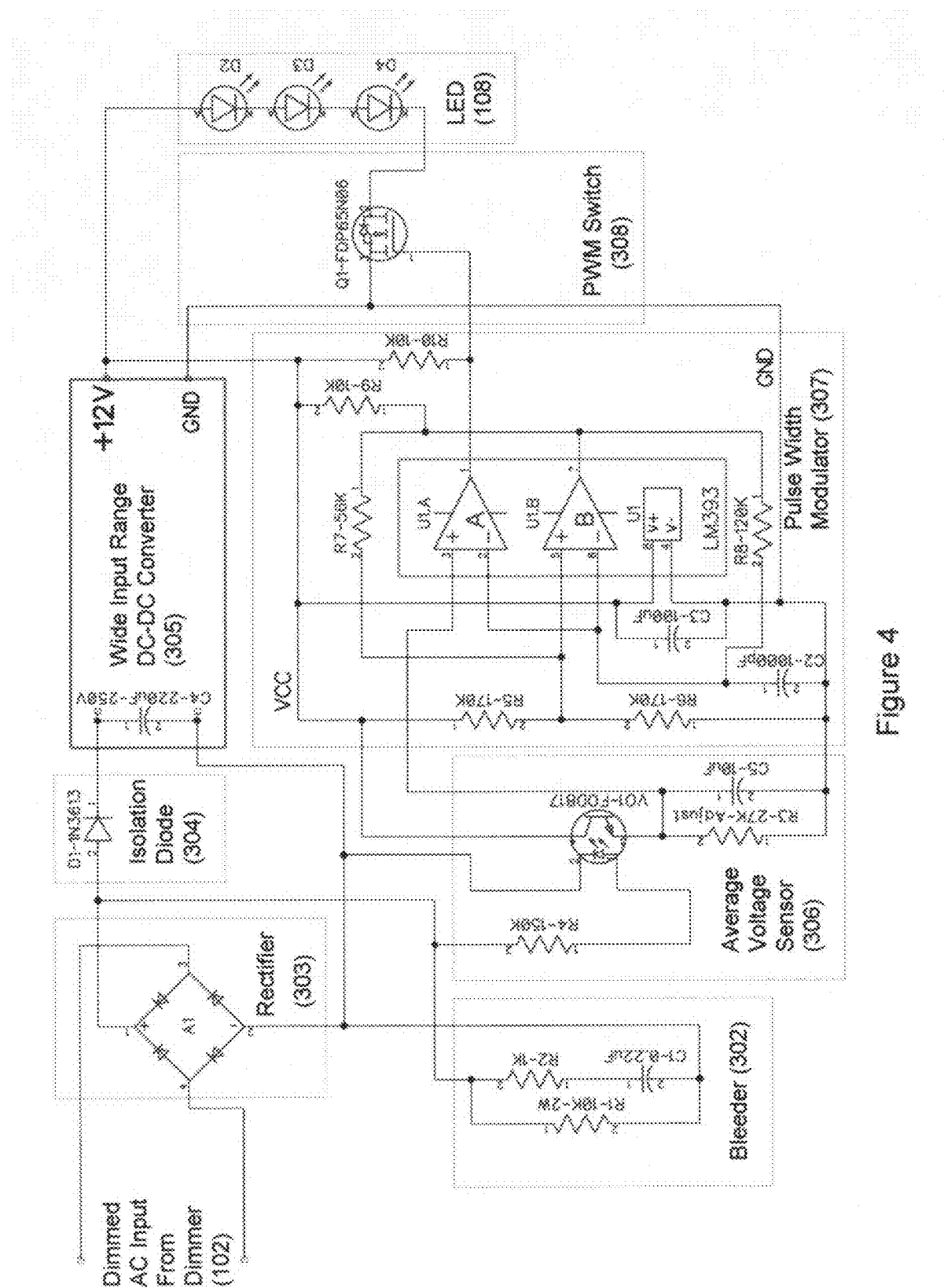
FIG. 4 shows one example implementation of the embodiment shown in FIG. 3.

FIG. 3 shows another embodiment of the current invention, which can be made from a conventional AC-DC converter with minor modifications. Two detailed implementation examples for the embodiment of FIG. 3 are shown in FIG. 4 and FIG. 5. As shown in FIG. 3, a typical conventional wide input range AC-DC converter already includes Rectifier (303) and Wide Input Range DC-DC Converter (305) directly connected. The modification includes cutting the original connection and inserting the Isolation Diode (304) between the Rectifier (303) and the Wide Input Range DC-DC Converter (305), and adding some components including Bleeder (302), Average Voltage Sensor (306), Pulse Width Modulator (307), and PWM Switch (308). The modification can be made by literally cutting the traces on an already manufactured AC-DC converter and adding the additional components (302), (304), (306), (307), and (308) on a separate board, but more preferably, the design can be modified with the additional components fabricated on the same board. Bleeder (302) is connected to the output of the Rectifier (303) to sink rectified DC current. An AC bleeder, similar to Bleeder (103) shown in FIG. 2 can also be used to sink AC current instead of, or in addition to, Bleeder (302), and the design still works. In the example implementations shown in FIGS. 4 and 5, Bleeder (302) is a passive bleeder formed by the resistors R1, R2 and capacitor C1.

Figure 5:
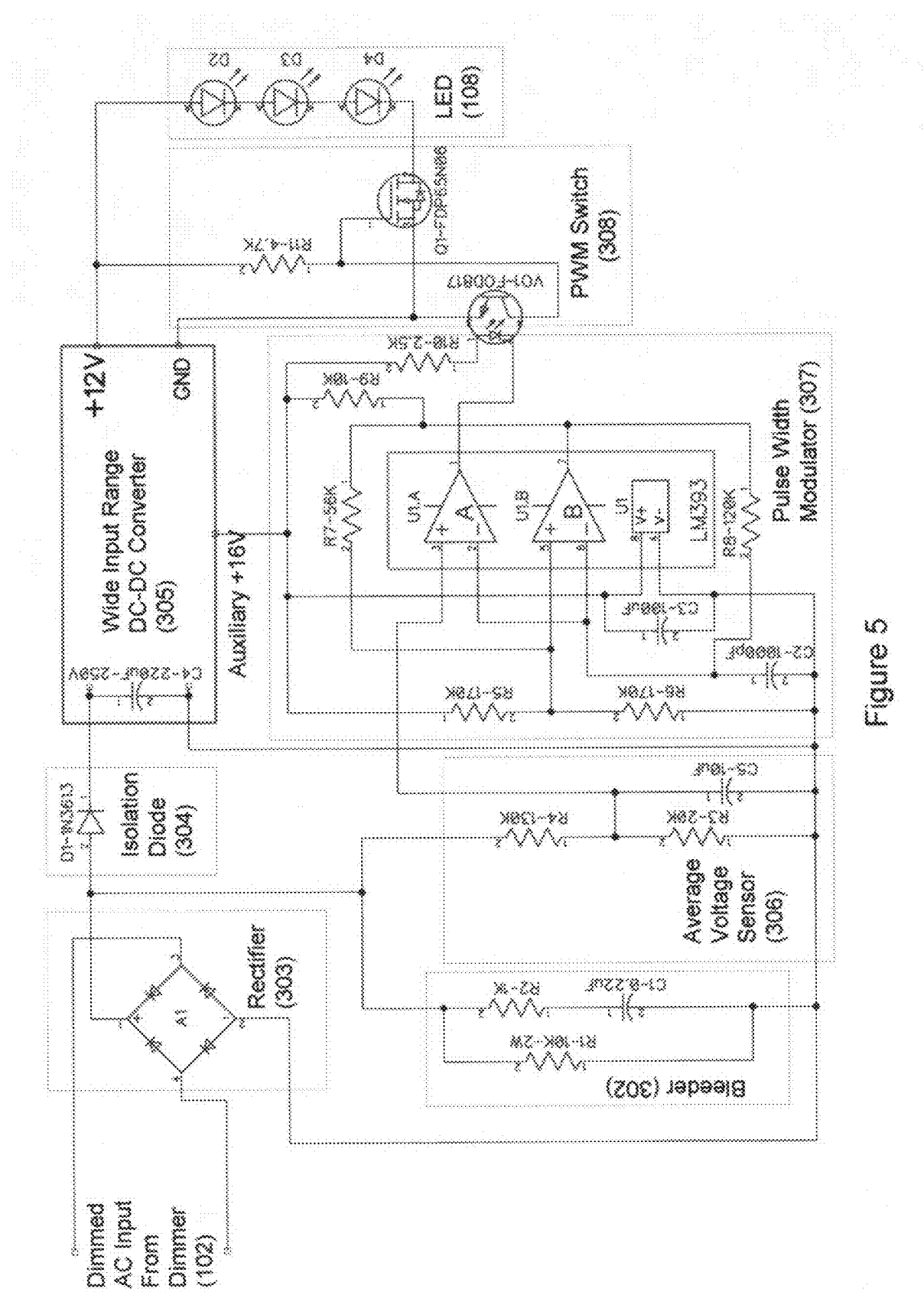
FIG. 5 shows another example implementation of the embodiment shown in FIG. 3.

Applicant observed that the passive bleeder formed by R1, R2 and capacitor C1 of FIG. 4 and FIG. 5 does not absolutely prevent premature shut-off of a TRIAC dimmer caused by lack of minimum holding current. When the AC voltage is high or moderate, C1 will be charged through R2, and the current charging capacitor C1, along with the current through R1, will provide enough holding current. However, when the AC voltage becomes very low. C1 will be discharged through resistors R2 and R1 in series. This discharging current can raise the voltage across R1 and it is possible that the voltage across R1 becomes higher than the AC voltage to make the rectifier reverse biased. When this happens, the current will be 0 and the TRIAC dimmer will be shut off prematurely. The effect is a small portion of the trailing edge of the AC waveform will be cut off. Applicant also observed that, at some dimming levels, such a premature cut-off can vary from cycle to cycle. For many other types of dimmable LED drivers, this would cause serious flicking problems. However, when used in the current invention, no serious harm is caused by such a premature shut-off. First, because a conventional AC-DC converter only has current flow through the rectifier when the AC voltage is near its peak anyway, cutting off a small tail of the AC waveform has no effect on the amount of power the converter is getting. Additionally, because the voltage used to control the Pulse Width Modulator (307) is averaged over many cycles of the AC frequency, the variations from cycle to cycle are smoothed out producing virtually constant voltage at the output of Average Voltage Sensor (306). The only effect left is that, because an additional trailing edge is cut, the dimming level is slightly shifted (for example, when the dimmer is adjusted to a nominal 50% dimming level, it will actually be 40%). This will not cause any serious problem. If enough margin on the top of the dimming range is designed as describe above, the dimmer can still control the duty cycle of the Pulse Width Modulator (307) to smoothly change from 0% to 100%. This example shows that a weaker and less perfect bleeder that may not work in some other types of dimmable LED drivers can be used in the current invention without causing serious problems. Using a weaker and less perfect bleeder has the advantage of reduced power consumption and simplicity.

Continuing the descriptions of FIG. 3, Isolation Diode (304) can simply be a diode, as shown in the implementation examples of FIG. 4 and FIG. 5. The reason for inserting an isolation diode is because a typical AC-DC converter usually has a large capacitor in front of the DC-DC converter following the rectifier (see C4 in FIG. 4 and FIG. 5 and C1 in FIG. 6). If the output of the rectifier is directly connected to this capacitor, they will form a peak holder, and the voltage at the output of the rectifier will be held near the peak of the rectified AC voltage, preventing the Average Voltage Sensor (306) from correctly measuring the average voltage. Inserting Isolation Diode (304) will isolate Rectifier (303) from this large capacitor and allow the output of the rectifier to rise and fall along with the AC voltage so that the Average Voltage Sensor (306) can get accurate measurement. In addition, the isolation diode and the large capacitor in front of the DC-DC converter still form a peak holder allowing the working range of the converter to be extended to very low average voltage levels, as discussed previously. The Average Voltage Sensor (306), the Pulse Width Modulator (307), and the PWM Switch (308) are essentially the same as the components (105), (106), and (107) in FIG. 1, with some minor design differences as shown in FIG. 4 and FIG. 5.

In the example implementation shown in FIG. 4, the Average Voltage Sensor (306) is basically the same as the Average Voltage Sensor (105) of FIG. 2, except that the rectified signal, instead of the AC signal is sensed. Therefore, a DC optoisolator such as FOD817 is used for VO1, instead of an AC optoisolator such as FOD814. The Pulse Width Modulator (307) and PWM Switch (308) shown in FIG. 4 are identical to the corresponding components (106) and (107) in FIG. 2.

In the implementation example shown in FIG. 5, however, the isolation boundary is not inside the Average Voltage Sensor (306) but is at the output of the PWM Switch (308). In addition, an auxiliary power supply provided by the DC-DC converter (305), which can be different from the converter output, is used to power the Pulse Width Modulator (307). In this example, the output of the Average Voltage Sensor (306) can be calculated as $$\frac{R3}{(R3+R4)}$$

$<V_{rect}>$, where $<V_{rect}>$ is the average voltage at the output of the Rectifier (303) which is roughly the same as the average AC voltage at the output of the dimmer (102). Because optoisolator is not used here, R3 and R4 can be fixed and does not have to be matched with the current transfer ratio of an optoisolator, and therefore, the problem discussed earlier with respect to FIG. 2, which also exists in the implementation of FIG. 4, can be avoided. Using the above formula and R3=20 kΩ, R4=130 kΩ, when the average voltage is changed by the dimmer (102) from 96V to 24V, the output voltage of the Average Voltage Sensor (306) will change from 12.8V to 3.2V, which corresponds to 80% and 20% of the auxiliary 16V power supply respectively. The Pulse Width Modulator (307) is the same as the Pulse Width Modulator (106) of FIG. 2, except it is powered by 16V instead of 12V. The voltage across capacitor C2 will be the same waveform shown in the upper part of FIG. 7, except that it oscillates between 20% and 80% of 16V (between 3.2V and 12.8V). Therefore, as the dimmer (102) changes the average voltage from 96V to 24V, the duty cycle of the output of the Pulse Width Modulator (307) will change from 100% to 0%. The output of the Pulse Width Modulator (307) is used to drive the PWM Switch (308) through the optoisolator VO1. Here, the variation of the current transfer ratio of the optoisolator is not an issue.

Figure 6:
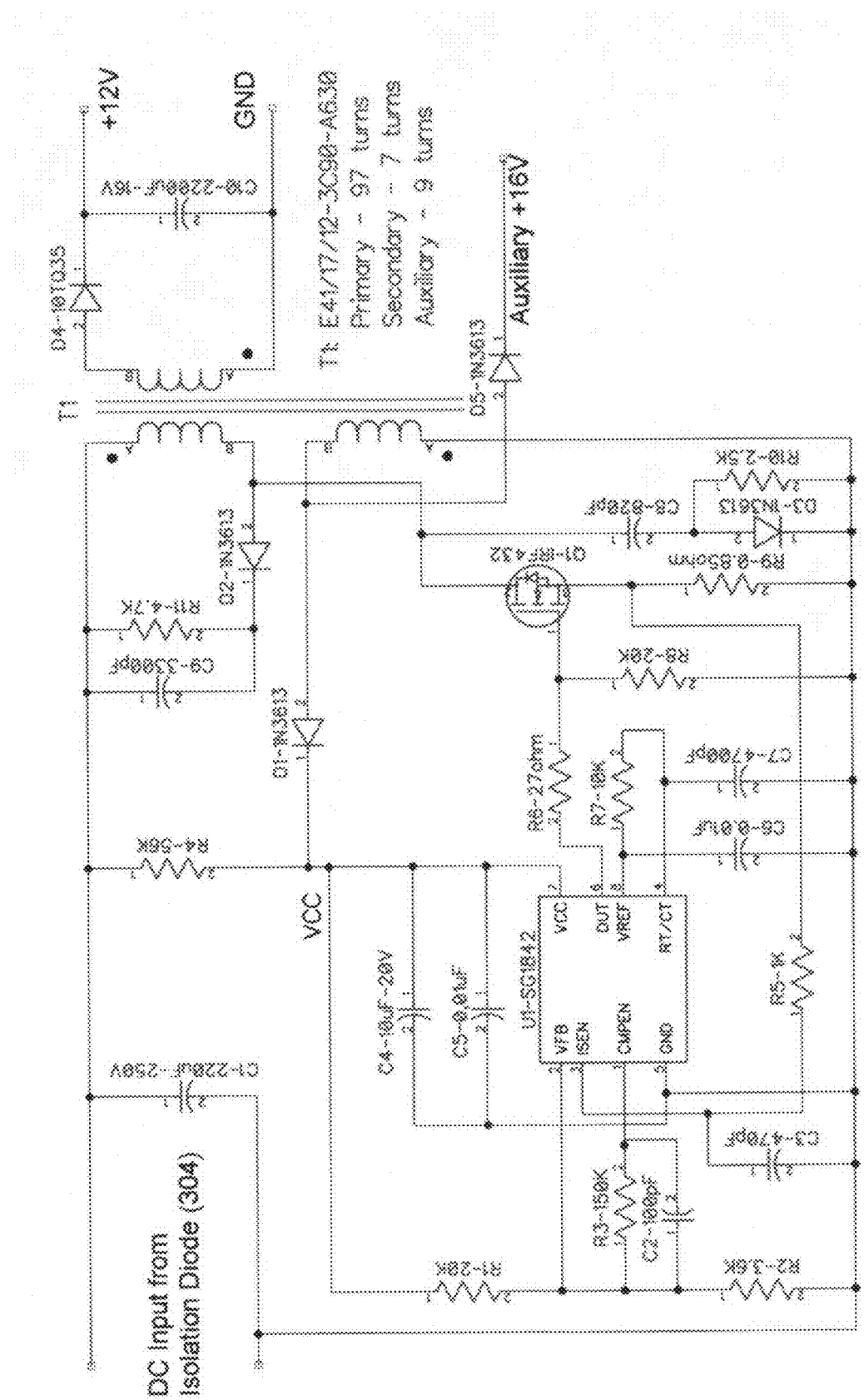
FIG. 6 shows an example design of a DC-DC converter that can be used in the circuits of FIG. 4 and FIG. 5.

FIG. 6 shows the DC-DC converter part of a typical wide input range AC-DC, converter that can be used as component (305) in both the implementations of FIG. 4 and FIG. 5. It also shows how the auxiliary power supply for the Pulse Width Modulator (307) is obtained. A typical AC-DC converter already has an auxiliary power supply derived from an auxiliary winding of the flyback transformer to power the controller IC (such as U1 shown in FIG. 6). This auxiliary power can be used for providing the auxiliary power for the Pulse Width Modulator (307). However, one needs to be careful, because the controller IC usually requires a small startup current obtained directly from the rectified AC source through a resistor such as R4 shown in FIG. 6. If the auxiliary power for the Pulse Width Modulator (307) is obtained directly from the VCC of the controller IC U1, the additional current drawn by the Pulse Width Modulator (307) may prevent the resistor R4 from pulling up the VCC of U1 to a high enough voltage to get started. Therefore, the auxiliary power should be obtained from the auxiliary windings and rectified with an additional diode D5, as shown in FIG. 6. Of course, if the current provided by R4 is enough to supply both the Pulse Width Modulator (307) and start the controller IC U1, then the auxiliary power for the Pulse Width Modulator (307) can be obtained directly from the VCC of U1. It is also possible to modify R4 to a smaller value to provide enough current to supply both the Pulse Width Modulator (307) and start the controller IC U1.

The above examples show how a constant voltage dimmable LED driver can be created by adding a few components to the design of a conventional AC-DC converter without or with very little modifications. The modifications and the additional components incur very little additional cost, require very little board space, and do not change the basic electrical and thermal characteristics of the original design of the AC-DC converter. All the over current, over voltage, and over temperature protection mechanisms built in the original AC-DC converter stay intact. Therefore, the well developed and perfected art of the conventional AC-DC converter can be leveraged to quickly create a constant voltage dimmable LED driver according to the current invention.

While this invention has been described in terms of several implementations, it is contemplated that alterations, modifications and permutations thereof will become apparent to those skilled in the art upon a reading of the specification and study of the drawings. For example, while the bleeders demonstrated in the example implementations are passive bleeders, those skilled in the art will recognize that various active bleeders can be used, including bleeders that are turned on only when the AC voltage falls below a certain level or when the AC-DC converter does not draw enough current to hold a TRIAC dimmer conductive. Such bleeders may waste less power than passive bleeders. In addition, a power factor corrected (PFC) AC-DC converter can be used in place of the conventional AC-DC converter demonstrated in the example implementations. A power factor corrected AC-DC converter will behave like a resistor and will draw current even when the AC voltage is very low, unlike a conventional AC-DC converter that only draws current when the AC voltage is near its peak. A PFC converter may draw enough current at low AC voltages to hold a TRIAC dimmer conductive and therefore the bleeder can be much weaker or even eliminated. Additionally, average voltage described above is only one measure of the AC voltage. Other type of measures can be used. For example, the Average Voltage Sensor can be replaced by a circuit that measures RMS voltage instead of the average voltage. In fact, any type of averaged measure of the voltage at the output of the dimmer can be used and the invention still works. Although the Pulse Width Modulator described above has a fixed frequency while the duty cycle is changed by changing the pulse width, a different design can be used in which both the frequency and the pulse width can change, as long as the frequency stays above the threshold of human's flickering perception. Non-linearity can be built into either the Average Voltage Sensor or the Pulse Width Modulator or both to make the dimming curve to appear more smooth to human perception (human perception for brightness is non-linear). While in the example implementations described above, the duty cycle of the Pulse Width Modulator can be changed from 0% to 100%, a different design can be made to limit the maximum duty cycle to be less than 100%, for example 50%. In this case, the output voltage of the AC-DC converter can be designed to be higher than the nominal voltage rating of the LED so that the average current through the LED can be the same as if the LED is driven with the rated voltage with 100% duty cycle. For example, a typical LED array rated 12V can be driven by a pulse train of 13V and 50% duty cycle to have roughly the same average current as if it is driven by 12V constantly on. In this way, the dimming level can still be changed from 0% to 100% but the duty cycle can be limited to be less than 100%. While the above descriptions primarily use LED lighting as an example, the invention can be used for driving other types of load, for example a halogen light. All these variations and many other possible variations not listed here will become apparent to those skilled in the art upon a reading of the specification and study of the drawings.

Furthermore, certain terminology has been used for the purposes of descriptive clarity, and should not be construed to limit the invention. Some numerical values of various parameters described above are only examples and should not be construed to limit the scope of the invention. One skilled in the art will recognize that different values may be used and the invention will still work. It is therefore intended that the following appended claims include all such alterations, modifications and permutations as fall within the true spirit and scope of the present invention.

I claim:

1. A circuit for adapting an AC input to drive a load comprising:
   a) a measuring circuit for obtaining an averaged measure of the voltage at the AC input;
   b) a power converting module, comprising an AC-DC converter and a switch for turning on and off a current path between the AC-DC converter and the load, for converting the AC input into a continuous train of pulses for driving the load, with a duty cycle controlled by the averaged measure of the voltage at the AC input obtained by the measuring circuit, wherein the switch for turning on and off the current path between the AC-DC converter and the load is controlled by a pulse width modulator oscillating at a substantially fixed frequency above human's flickering perception threshold and having a pulse width controlled by the averaged measure of the voltage at the AC input obtained by the measuring circuit.

2. The circuit of claim 1 wherein the load is an array of at least one LED.

3. The circuit of claim 1 wherein the AC input is obtained from an AC power source through a dimmer.

4. The circuit of claim 3 further including a bleeder for providing minimum holding current for the dimmer, wherein the bleeder can be an imperfect bleeder that can have a small amount of premature termination of the holding current and pulse to pulse variations.

5. The circuit of claim 1 wherein the pulse width modulator comprising a first voltage comparator or op-amp for controlling charging and discharging of a capacitor to create, at the capacitor, a continuously running voltage waveform that ramps up and down corresponding to charging and discharging of the capacitor and a second voltage comparator or op-amp for comparing the voltage at the capacitor with a voltage representing the averaged measure obtained by the measuring circuit, wherein the output of the second voltage comparator or op-amp is used to control the switch for turning on and off the current path between the AC-DC converter and the load.

6. The circuit of claim 1 wherein the AC-DC converter can operate stably over a wide range of the AC input to produce a substantially constant voltage output and, as the voltage at the AC input is gradually reduced, the duty cycle gradually reduces and can reach 0% before the voltage at the AC input reaches the low end of the stable operating range of the AC-DC converter.

7. The circuit of claim 1 wherein the AC-DC converter comprising a rectifier, an isolation diode, and a DC-DC converter, wherein the input of the rectifier is connected to the AC input, the output of the rectifier is connected to the anode of the isolation diode, the cathode of the isolation diode is connected to the input of the DC-DC converter, and the measuring circuit obtains its input from the output of the rectifier before the isolation diode.

8. The circuit of claim 1 wherein the averaged measure of the voltage at the AC input is approximately proportional to a simple average of the absolute value of the voltage at the AC input.

9. A method for adapting an AC input to drive a load comprising:
   a) obtaining an averaged measure of the voltage at the AC input;
   b) using a power converting module comprising an AC-DC converter and a switch for turning on and off a current path between the AC-DC converter and the load to convert the AC input into a continuous train of pulses for driving the load, with a duty cycle controlled by the averaged measure of the voltage at the AC input, wherein the switch for turning on and off the current path between the AC-DC converter and the load is controlled by a pulse width modulator oscillating at a substantially fixed frequency above human's flickering perception threshold and having a pulse width controlled by the averaged measure of the voltage at the AC input obtained by the measuring circuit.

10. The method of claim 9 wherein the load is an array of at least one LED.

11. The method of claim 9 wherein the AC input is obtained from an AC power source through a dimmer.

12. The method of claim 11 further including using a bleeder for providing minimum holding current for the dimmer, wherein the bleeder can be an imperfect bleeder that can have a small amount of premature termination of the holding current and pulse to pulse variations.

13. The method of claim 9 wherein the pulse width modulator comprising a first voltage comparator or op-amp for controlling charging and discharging of a capacitor to create, at the capacitor, a continuously running voltage waveform that ramps up and down corresponding to charging and discharging of the capacitor and a second voltage comparator or op-amp for comparing the voltage at the capacitor with a voltage representing the averaged measure obtained by the measuring circuit, wherein the output of the second voltage comparator or op-amp is used to control the switch for turning on and off the current path between the AC-DC converter and the load.

14. The method of claim 9 wherein the AC-DC converter can operate stably over a wide range of the AC input to produce a substantially constant voltage output and, as the voltage at the AC input is gradually reduced, the duty cycle gradually reduces and can reach 0% before the voltage at the AC input reaches the low end of the stable operating range of the AC-DC converter.

15. The method of claim 9 wherein the AC-DC converter comprising a rectifier, an isolation diode, and a DC-DC converter, wherein the input of the rectifier is connected to the AC input, the output of the rectifier is connected to the anode of the isolation diode, the cathode of the isolation diode is connected to the input of the DC-DC converter, and the measuring circuit obtains its input from the output of the rectifier before the isolation diode.

16. The method of claim 9 wherein the averaged measure of the voltage at the AC input is approximately proportional to a simple average of the absolute value of the voltage at the AC input.

* * * * *